July 17, 1951  F. SCHOLZ  2,560,782
X-RAY APPARATUS
Filed Jan. 5, 1949  3 Sheets-Sheet 1
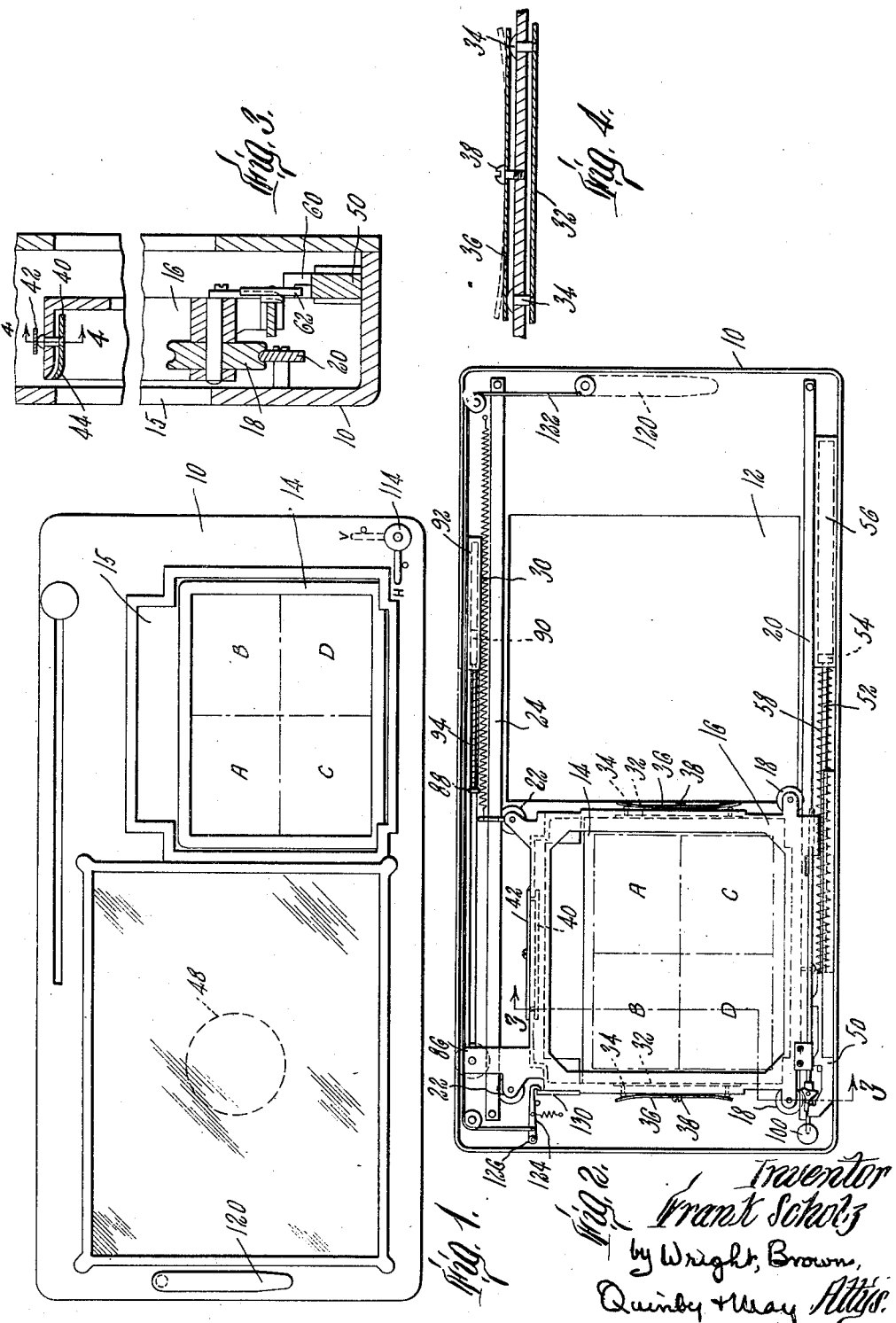
Inventor
Frank Scholz
by Wright, Brown,
Quinby + May Attys.

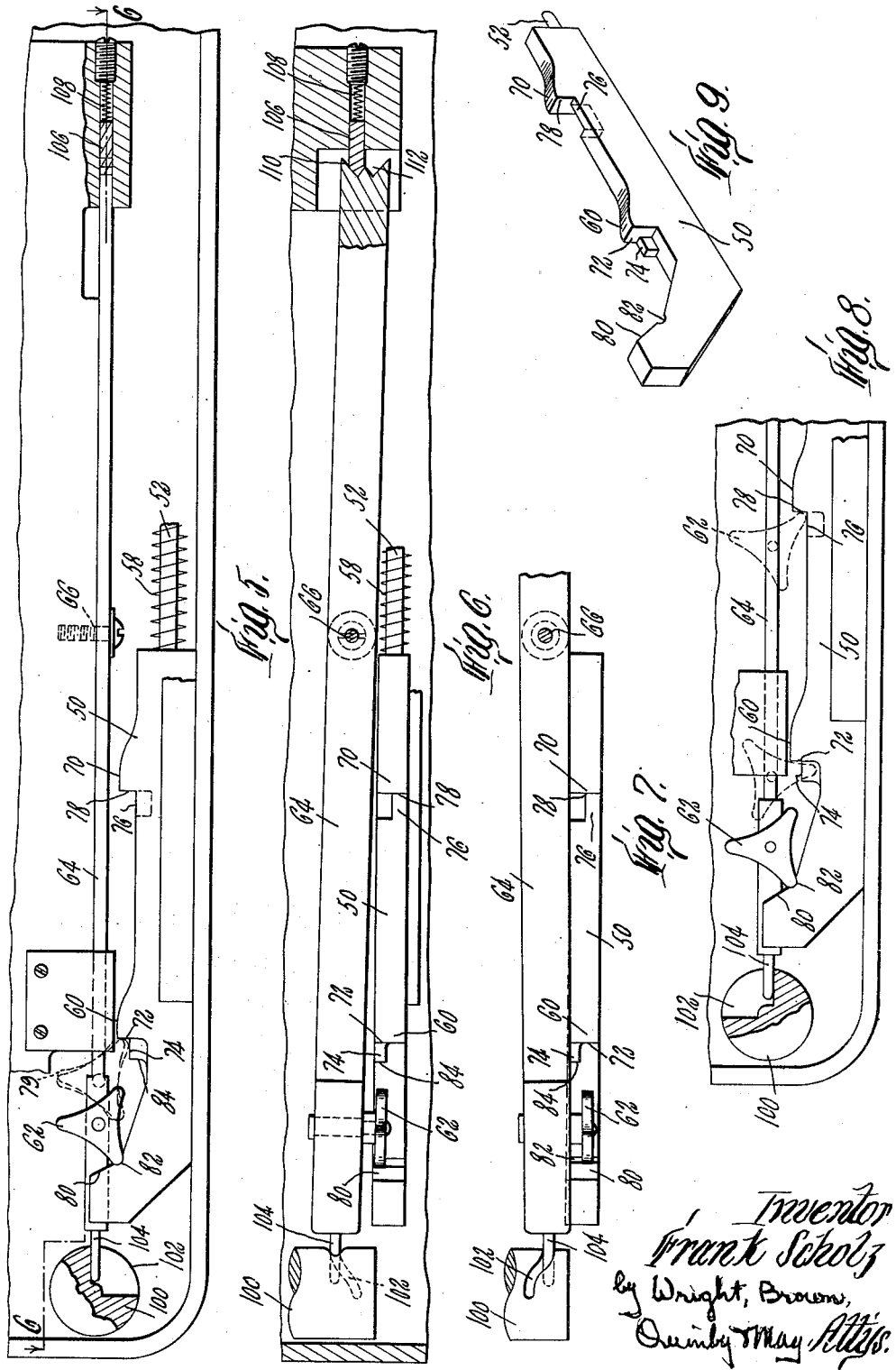

July 17, 1951  F. SCHOLZ  2,560,782
X-RAY APPARATUS
Filed Jan. 5, 1949  3 Sheets-Sheet 3
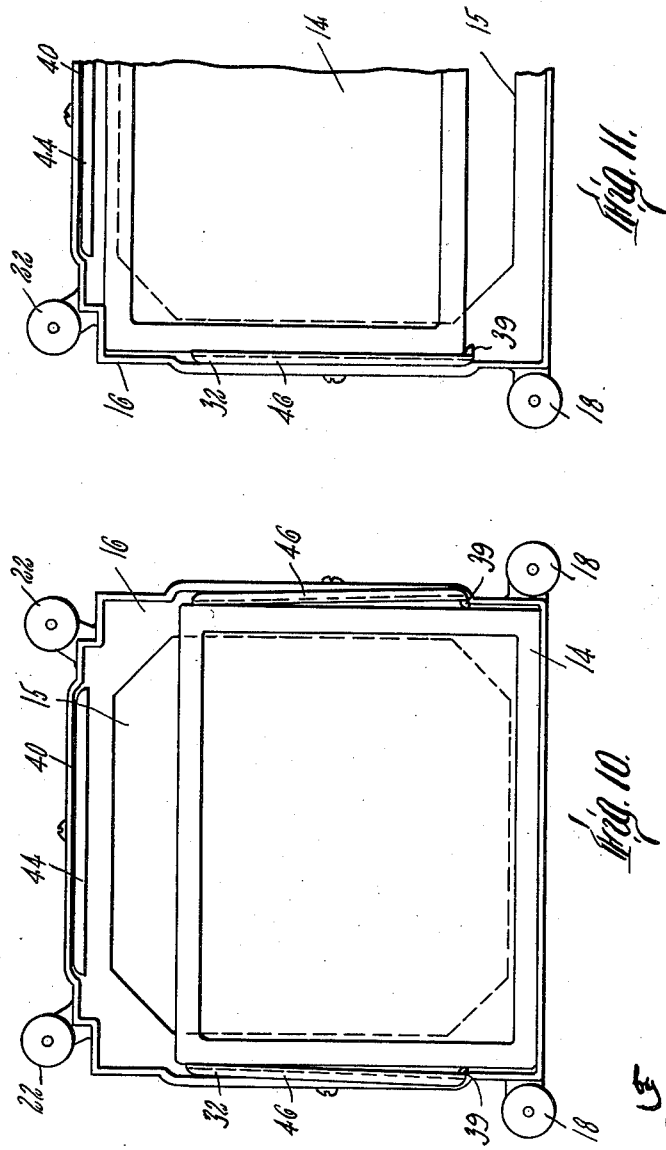
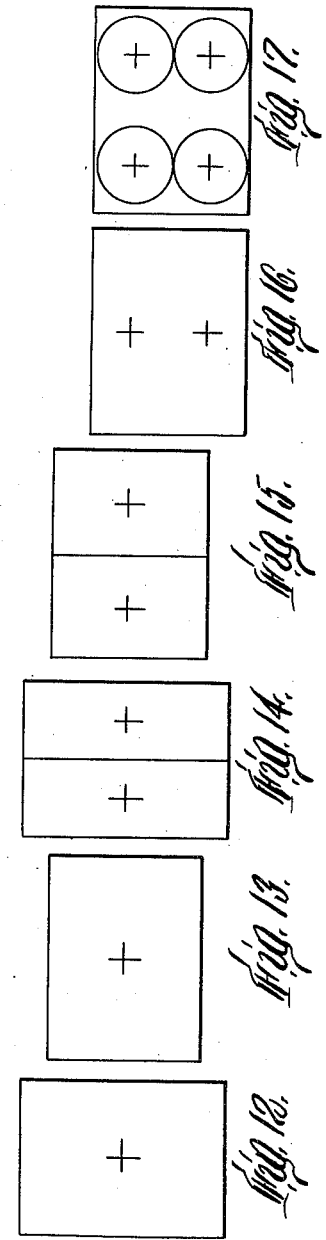
Inventor
Frank Scholz
by Wright, Brown,
Quinby & May
Attys.

Patented July 17, 1951

2,560,782

UNITED STATES PATENT OFFICE 2,560,782

X-RAY APPARATUS

Frank Scholz, Wayland, Mass.

Application January 5, 1949, Serial No. 69,312

7 Claims. (Cl. 250—66)

This invention relates to improvements in X-ray apparatus such as is described and illustrated in my Patent No. 2,184,962, granted December 26, 1939.

The use of X-ray apparatus by the medical profession for diagnostic purposes generally involves the taking of photographs by exposing sensitized film to X-rays which have passed through the part of the patient to be examined. In many phases of radiography it is important, both for economy and for sharp definition, to use only one-half or one-quarter of a film for an exposure if the size of the subject permits, since the size of the X-ray beam can be correspondingly cut down by means of the shutter-diaphragm through which the beam is projected. According to the present invention, an oblong cassette can be placed in the holder with its long axis either vertical or horizontal. As hereinafter described, any one of six different areas may be employed, such areas differing in size or arrangement, or both. Thus, for example, the entire area of a film may be exposed with the long dimension horizontal or vertical, or portions of a film can be successively exposed.

In making exposures for diagnostic purposes, it is very important that the subject be correctly arranged before each exposure is made. For this purpose, a fluorescent screen is mounted in a fixed frame in the path of the X-ray beam to present a visual shadow picture of the part of the subject which is in the beam and a relatively weak current is used in the ray-emitting apparatus. When the subject is suitably arranged by inspection of the fluoroscope, the cassette which carries the film should promptly be moved into line with the beam and the power should be stepped up to make a good exposure. For this purpose, the cassette is placed in a cassette holder or carriage which is adapted to roll in the frame from an offset or inactive position to an active position in line with the X-ray beam. When the cassette is in an active position, it is important that the portion of the film which is to be exposed be properly centered with respect to the beam. Thus, the carriage should be stopped at the proper point when moved from the offset position, this point depending on what portion of the film is to be exposed. The carriage is adapted to receive and hold an oblong cassette with the long axis horizontal or vertical, as desired. According to the invention, the carriage is arranged to be stopped at the proper points to center the portions of the film to be exposed.

Inasmuch as the operator who manipulates the cassette and makes the exposures operates in almost total darkness, it is an object of the invention to provide apparatus which can easily be operated by the sense of touch to expose the film in the various different ways hereinafter described, the apparatus being designed to facilitate the proper centering of each area to be exposed and to minimize the possibility of error in handling the cassette.

For a more complete understanding of the invention, reference may be had to the following description thereof and to the drawing, of which—

Figure 1 is a front elevational view of an embodiment of the invention;

Figure 2 is a rear view of the same, the back plate having been removed;

Figure 3 is a fragmentary section on the line 3—3 of Figure 2;

Figure 4 is a section on the line 4—4 of Figure 3;

Figure 5 is a fragmentary elevation of the mechanism shown in the lower left-hand corner of Figure 2, on a larger scale;

Figure 6 is a plan view of the mechanism shown in Figure 5;

Figure 7 is a plan view of a portion of the mechanism shown in Figure 6, the parts being in a different position of operation;

Figure 8 is a fragmentary elevational view of the portion of the mechanism shown in Figure 7;

Figure 9 is a perspective view of the abutment member shown in Figure 5 and other figures;

Figure 10 is a front elevation of the cassette holder or carriage having a cassette therein;

Figure 11 is a partial view of the same, the cassette being shown in an elevated position; and Figures 12 to 17 are six diagrams of a film, showing different ways of exposing the film. For convenience in describing the relative positions of the various parts of the apparatus, it will herein be thought of as standing in an upright position on one of its long edges, as indicated in Figure 1, but it is to be understood that in actual use it may be placed in a horizontal plane or in an inclined position.

Figures 1 and 2 illustrate a rectangular frame 10 which is provided with an opening or window 12 through which sensitized films or plates can be exposed to X-rays. In using X-rays for diagnostical and similar purposes, it is important that the subject be properly located and arranged so that the X-ray picture to be taken will be significant and informative. For this purpose, it is customary to mount a fluorescent screen in the opening 12 so that a visual inspection can be made readily of the subject. When the subject is properly arranged and ready for the taking of the X-ray picture, it is desirable that the sensitized film or plate be moved quickly into a suitable position in the opening 12 so as to be exposed to the rays.

As described in my Patent No. 2,184,962, the movement of the cassette holder from the inactive position shown in Figure 2, to an active position in line with the X-ray beam, can be accomplished conveniently in the brief interval in which the power of the X-rays is stepped up from the relatively weak radiation suitable for visual inspection on a fluorescent screen to the much stronger radiation required for acting on a sensitized film within a reasonably brief time interval.

According to the present invention, the apparatus is provided for shifting the cassette holder horizontally from its inactive position to any one of three active positions selected according to the portion of the film to be exposed to the rays.

A cassette 14, which is a rectangular frame adapted to contain a suitable sensitized film, can be readily inserted through an opening 15 in the frame into a cassette holder or carriage 16 having rollers 18 which travel on a lower track 20, and upper rollers 22 which travel on an upper track 24, the tracks being mounted within the frame 10. A suitable means of propelling the carriage is provided, such as a spring 30 of suitable length and strength, attached at one end to the carriage 16 and at the other end to the frame 10, this spring being arranged so as to pull the carriage constantly toward the active position, that is, toward the right as shown in Figure 2. The carriage 16, as indicated in Figures 10 and 11, is adapted to hold the cassette in either one of two positions in which the long axis of the cassette is horizontal, and in a position in which this axis is vertical. Hence, the horizontal length of the opening in the carriage 16 is slightly greater than the overall length of the cassette. At either end of this opening is mounted a presser 32 carried by a pair of plungers 34 which project through the end walls of the carriage and bear against the ends of a leaf spring 36 which is secured at its mid-point to the wall of the carriage by a screw 38. The strips 32 at the ends of the carriage are thus spring-pressed against the ends of a cassette when the latter is placed horizontally therein, and serve to hold the cassette in place. At the lower end of each presser strip 32 is a small boss 39 which engages under a lower corner of a cassette when the latter is in elevated position, as illustrated in Figure 11, for a purpose hereinafter explained. The opening in the carriage is shaped to hold a cassette with its long axis vertical and midway between the sides of the carriage. The vertical median of the cassette in the holder thus coincides with the vertical median of the opening no matter which way the cassette is placed in the opening. A presser strip 40, similar to the strips 32, is mounted at the upper edge of the opening and is spring-pressed by a spring 42, to hold a cassette when placed in the carriage with its long axis vertical. As indicated in Figure 3, the presser strip 40 is provided with an outwardly flaring flange or lip 44 to wedge the strip outward when a cassette is pushed into place in the holder with its long axis vertical. The presser strips at the sides of the holder are likewise provided with flanges or lips 46 for the same purpose.

The X-ray tube is not shown in the drawings, but in use, the frame 10 is arranged with reference thereto so that the beam of rays centers on the area indicated by the circle 48 in Figure 1. The size of the beam is controlled by the usual shutters (not shown), the smaller the beam, the greater being the clarity of definition. Hence, it is highly desirable that not only for reasons of economy but especially for clarity of definition, the smallest beam be employed which will cover the subject, and that the subject be carefully centered with respect to the beam. This means that the area of film which is to be exposed should be centered as accurately as possible with the circle 48 shown in Figure 1 when exposed to the beam. The area to be exposed may be the entire area of the film or a half or a quarter thereof, according to the size of the subject. Figure 1 shows a cassette in which quarter areas are indicated by broken lines and designated by the letters A, B, C and D, the horizontal median of the areas A and B being at the same level as the center of the circle 48. Thus, if the cassette be shifted to an active position in which the vertical median of the area A or B registers with the center of the circle, then the area A or B will be accurately centered with respect to the beam. Hence, means are provided for automatically stopping the carriage on successive trips toward the active end of the frame alternately at positions in which the areas A and B are respectively centered on the circle 48. After the areas A and B are exposed, the cassette is taken out, inverted to bring the areas C and D uppermost, and reinserted in the holder. The areas C and D are then ready to move into centered relation with the circle 48.

The two conditions for exposure described in the preceding paragraph, namely, those illustrated in Figures 12 and 17, can be met by the apparatus shown and described in said Letters Patent No. 2,184,962. According to the present invention, apparatus is provided which meets the conditions for exposure illustrated in Figures 13 to 16 as well as in Figures 12 and 17. Such apparatus includes the shape of the carriage opening which receives the cassette with its long axis vertical or horizontal, the vertical median in either case coinciding with the vertical median of the cassette holder itself, and which permits the cassette to be moved up to an upper position in the carriage (as shown in Figure 11) when the long axis of the cassette is horizontal. Such apparatus also includes the small bosses 39 which hold the cassette yieldingly in its upper position in the carriage, and stop means for stopping the carriage in three different positions when it travels from the inactive end of the frame 10 toward the active end.

The circle 48 is located in such a manner with reference to the carriage that when the cassette is in its lower position with reference to the carriage, as shown in Figures 1, 2 and 10, its center is on a level with the areas A and B of the cassette, that is, three-quarters of the height of the cassette up from the lower edge thereof. When the cassette is in the upper position shown in Figure 11, the center of the circle 48 is on a level with the horizontal median of the cassette.

The carriage stopping mechanism, hereinafter described, is designed to stop the carriage, first, when the vertical median of the area A registers with the center of the circle 48, second, when the vertical median of the cassette itself (either in its horizontal or vertical position) registers with the center of the circle; and, third, when the vertical median of the area B registers with the center of the circle.

For the purpose of stopping the carriage in the first two positions, an abutment member 50 having two stop elements is movably mounted at the lower margin of the frame 10. This abutment member is attached to a stem 52 which carries a piston 54 operating in a dashpot 56. Movement of the abutment member 50 toward the right is resisted and cushioned by a spring 58 which is considerably weaker than the spring 30. The abutment member 50 is provided with a stop element 60 which is adapted to be engaged by a triangular pawl 62, as indicated in Figure 5. This pawl is rotatable about an axis perpendicular to the plane of the carriage and is mounted on a horizontal lever 64 pivoted at 66 to the bottom edge of the carriage 16. The pawl 62 is thus adapted to be shifted axially in and out between two operative positions illustrated respectively in Figures 6 and 7.

The abutment member 50 is also provided with a second stop element 70 similar in height and shape to the element 60. The latter has a vertical face or shoulder extending down from the crest thereof. When the pawl is in its outer position (as in Figure 7) the leading tooth engages and slides down the shoulder 72 sufficiently to permit the pawl to rotate and pass over the stop element 60. When the pawl is in its inner position (as in Figure 6) the downward movement of its leading tooth after it strikes the shoulder 72 is stopped by a step 74 and the pawl cannot pass over the stop element 60 but stops further travel of the carriage relative to the abutment member 50. In like manner, when the pawl is in its outer position, the leading tooth engages a step 76 after striking the shoulder 78 of the stop element 70 and thus stops further travel of the carriage relative to the abutment element 50. In either case, the travel of the carriage continues with the abutment member until the piston 54 reaches the end of the dash-pot 56. The stop element 60 is thus instrumental in bringing the carriage to a stop in the first said position when the pawl is in its inner position, and the stop element 70 stops the carriage in the second position when the pawl is in its outer position.

Since the first position of the carriage centers area A with respect to the circle 48, the next stroke of the carriage must be to the third position so as to center the area B. To achieve this, the pawl 62, after catching on the shoulder 72, must on the next stroke pass over the stop element 60. This is done as follows: When the carriage is returned toward the left to its inactive position after it has been stopped in the first position, the pawl 62 is in a slightly different angular position, as indicated at 79 in dotted lines in Figure 5, with the left-hand tooth slightly higher than the right-hand tooth, as a result of the pawl being turned slightly in a clockwise direction when it engages the shoulder 72. This elevated left-hand tooth strikes an inclined surface 80 on the abutment member which is just above a shallow notch 82 and rotates the pawl so that the right-hand tooth swings down to a level below that of the step 74. When the carriage thereafter makes its next movement toward the right, the leading tooth of the pawl engages the front face 84 of the step and causes the pawl to rotate sufficiently to pass over the stop element 60 and to allow the carriage to proceed further toward the right with respect to the abutment member 50. Since there is no step in front of the stop element 70 in this path of the pawl, the pawl rotates again when it encounters the stop element 70 and is not caught thereby. The carriage is then stopped in the third position by the engagement of a bracket element 86 with a spring-pressed plunger 88 connected to a piston 90 in a dash-pot 92 mounted at the upper margin of the frame 10. A spring 94 cushions the blow and slows up the carriage until it is stopped by engagement of the piston 90 with the right-hand end of the dash-pot 92. This brings the center line of the area B into registration with the center of the circle 48.

When the carriage is returned from the third position to its inactive position, the pawl travels over the stop elements 70 and 60, the latter being so shaped that when the pawl leaves it, the left-hand tooth is lower than the notch 82 and is guided into engagement therewith when the carriage reaches its inactive position. This turns the pawl to the angular position shown in full lines in Figure 5. The pawl is then ready to be caught by the shoulder 72 when the carrier next moves toward the right.

When it is desired to stop the carrier in the second position, that is, with the vertical median of the cassette registering with the center line of the circle 48, the pawl 62 is moved out to the position indicated in Figure 7. To this end, the arm 64 may be swung by any convenient means, such as the rotation of an arbor 100 having a cam slot 102 in the side thereof, in which rides a pin 104 projecting from the left-hand end of the lever 64. Rotation of the arbor 100 in one direction or the other swings the arm 64 from one position to the other, these positions being accurately determined by a plunger 106 which is pressed by a spring 108 into either one of two notches 110 and 112 in the right-hand end of the arm. The plunger 106 serves also to hold the arm releasably in one position or the other. The arbor 100 has a finger knob 114 at the front of the frame for rotation thereof. When the arm is in the position indicated in Figure 7, the pawl 62 is in line with the step 76 and not with the step 74. Hence, when the carriage moves toward the right and the pawl reaches the stop element 60, the leading tooth can slide down the face of the stop element as far as necessary to permit the pawl to rotate and pass over this stop element. When the pawl reaches the stop element 70, the leading tooth catches on the step 76, causing the carriage to stop in the second position, that is, with the median of the cassette registering with the center line of the circle 48. It may be noted that when the carriage returns to its inactive position, the left-hand tooth catches in the groove 82 so that as long as the pawl is in its outer position, the carriage always stops in the second position only.

Since the cassette can be adjusted up and down between two positions in the holder and can be stopped in three positions in its horizontal travel toward the active end of the frame, any one of the six modes of exposure illustrated in Figures 12 to 17 can be employed. For a single exposure of the whole film in the upright position, as in Figure 12, the pawl is shifted to its outer position so that the carriage will be stopped in its second position. For a single exposure, as in Figure 13, the cassette is inserted with its long axis horizontal and is then moved up to its upper position in the carriage opening and is supported in such position by the bosses 39. The pawl remains in its outer position.

For two exposures, as in Figure 14, the pawl is shifted to its inner position so that the carriage will stop alternately at positions one and three. In these positions, centering of the areas will be only approximate since the first and third positions of the carriage are determined with reference to the center lines of the areas A and B when the cassette is horizontal, and the center of the circle 48 is on a level with the center of the area A, which is slightly above the center of the center of either area in Figure 14, but the difference is not sufficient to be noticeable.

For two exposures, as in Figure 15, the cassette is inserted horizontally and is shifted to its upper position. The pawl must be in its inner position. These areas will be accurately centered with the circle 48.

For the two exposures, as in Figure 16, the cassette is inserted horizontally but left in its lower position. The pawl must be in its outer position. These areas are accurately centered.

For the four exposures, as in Figure 17, the cassette is left in its lower position and the pawl is in its inner position. The circles in this figure indicate the areas exposed when a compression cone is used. In making the exposure, the upper areas are first exposed; then the cassette is removed and reversed so that the lower areas are uppermost. These are then exposed as hereinbefore described. All these areas are accurately centered.

For convenient operation of the cassette, a handle 120 is mounted on the front of the frame and is connected by a cord or wire 122 to a latch member 124 pivoted to the frame at 126. This latch normally catches on a projection 130 on the carriage and holds the carriage in its inactive position against the constant pull of the spring 30. When the handle 120 is rocked, the latch 124 releases the carriage and permits it to be pulled to one of its three active positions by the spring 30, the carriage being automatically stopped in the selected position, as hereinbefore described. In the following claims, as in the specification, the apparatus is described as being in an upright position on one of its long edges as a base.

I claim:

1. Apparatus of the class described, comprising a cassette holder with an opening adapted to receive a cassette with its long axis horizontal, spring-pressed strips carried by the holder in position to press against the ends of a cassette thus located in the holder, said opening being of sufficient height to permit upward movement of the cassette relative to the holder to a predetermined upper position therein, and means on said holder releasably supporting the cassette in said upper position.

2. Apparatus of the class described, comprising a cassette holder having an opening shaped to receive a cassette with its long axis horizontal or vertical and its vertical median in both cases coinciding with the center line of said holder, said opening being of sufficient height to permit upward movement relative thereto of a horizontally placed cassette therein to a predetermined upper position, and means releasably supporting the cassette in said upper position.

3. Apparatus of the class described, comprising a rectangular frame, a cassette holder mounted to travel therein from an inactive position to three active positions, said holder having an opening therein shaped to receive a cassette with its long axis either horizontal or vertical and its vertical median in both cases coinciding with the vertical median of the cassette holder, said opening also being of sufficient height to permit upward movement relative thereto of a cassette placed horizontally therein to a predetermined upper position, means for causing the cassette holder to travel toward said active positions, means for stopping said holder in the second of said three positions, means for stopping said holder alternately at the first and third of said positions on successive trips thereof, and manually operable means for making either of said stopping means effective.

4. Apparatus of the class described, comprising a rectangular frame, a cassette holder arranged to travel back and forth in said frame from an inactive position to three spaced stations, said holder having an opening shaped to receive and support an oblong cassette with either its longitudinal median or transverse median coinciding with the vertical median of said opening, means on said frame for stopping said holder selectively at said stations, said stopping means including a triangular pawl carried by said holder and rotatable about an axis perpendicular to the plane of the frame, manual operable means for shifting said pawl bodily between two positions of operation relative to said holder, and an abutment member carried by said frame in operative relation to said pawl, said abutment member having two sets of stop elements and cam elements alternatively engageable by said pawl when in its respective operative positions, one said set of stop elements and cam elements being arranged to stop said holder at the second of said stations, the other set of stop elements and cam elements being arranged to stop said holder at the first said station on alternate strokes of the holder and to permit the holder to pass both the first and second stops on the other alternate strokes of the holder, and means yieldingly maintaining said pawl in one or the other of said positions of operation.

5. Apparatus of the class described, comprising a rectangular frame, a cassette holder mounted in said frame and movable therein between an inactive position and a plurality of predetermined active stations, means for stopping said holder selectively in said active stations, said means comprising an arm pivotally mounted on said holder and extending in the direction of the travel thereof, said arm being rockable about an axis parallel to the plane of said holder, a triangular pawl mounted on said arm and rotatable about an axis perpendicular to the plane of the holder, means for rocking said arm to move said pawl between two operative positions, means yieldingly retaining said arm with the pawl in either of said operative positions, and an abutment member carried by said frame in operative relation to said pawl, said abutment member having a stop element engageable by said pawl when said arm is in one position to stop said holder at one of said stations, and a second stop element engageable by said pawl when the arm is in its other position to stop said holder at another of said stations.

6. Apparatus of the class described, comprising a rectangular frame, a cassette holder mounted on said frame in the plane thereof and movable back and forth therein between an inactive position and a plurality of active stations, means for stopping said holder selectively in said active stations, said means including a triangular pawl rotatably carried by said holder parallel to the plane thereof and axially movable between two positions of operation relative to the holder, an abutment element carried by said frame and operatively engageable by said pawl to stop the holder selectively at predetermined active stations, said abutment element having two stop elements respectively engageable by said pawl when in its two operative positions, and means yieldingly retaining said pawl in either of said operative positions.

7. Apparatus of the class described, comprising a rectangular frame, a cassette holder having an oblong opening to receive a cassette mounted on said frame and movable thereon from an inactvie position to any one of three active stations in which one-quarter, one-half, and three-quarters, respectively, of said opening has passed a predetermined point of reference of said frame, said opening having an extension along the midportion of one of its longer side edges and midway between the ends thereof to receive an oblong cassette therein with its long axis either horizontal or vertical but with its vertical median always registering with the vertical median of said opening, and a plurality of stop elements selectively to stop said holder at respective stations.

FRANK SCHOLZ.

REFERENCES CITED

The following references are of record in the file of this patent:

UNITED STATES PATENTS

| Number | Name | Date |
| --- | --- | --- |
| 2,063,878 | Linke et al. | Dec. 8, 1936 |
| 2,184,962 | Scholz | Dec. 26, 1939 |
| 2,291,139 | Borthwick | July 28, 1942 |
| 2,327,603 | Kizaur | Aug. 24, 1943 |